3,541,601
APPARATUS FOR MIXING A GAS OR LIQUID TO ANOTHER GASEOUS OR LIQUID MEDIUM

Johan F. Witte and Nicolaas Cornelis Strijder, Amsterdam, Netherlands, assignors to Continental Engineering Ingenieursbureau voor de Procesindustrie N.V., Amsterdam, Netherlands, a Dutch limited-liability company
Filed Jan. 15, 1969, Ser. No. 791,248
Claims priority, application Netherlands, Jan. 16, 1968, 6800645
Int. Cl. B05b 1/06; B01f 3/04
U.S. Cl. 261—118          3 Claims

ABSTRACT OF THE DISCLOSURE

A pipe for mixing a gas or a liquid to another gaseous or liquid medium, with a local constriction formed by a rim whose lateral surfaces are substantially perpendicular to the pipe wall, at that constriction a radial annular slot being disposed to which the supply pipe for said medium is connected, said medium entering the pipe substantially perpendicularly to the axis of the liquid flow, the slot receiving a ring made of rubber which can close this connection and opens the connection by the pressure of the medium against the force of a spring.

---

Figure 1:
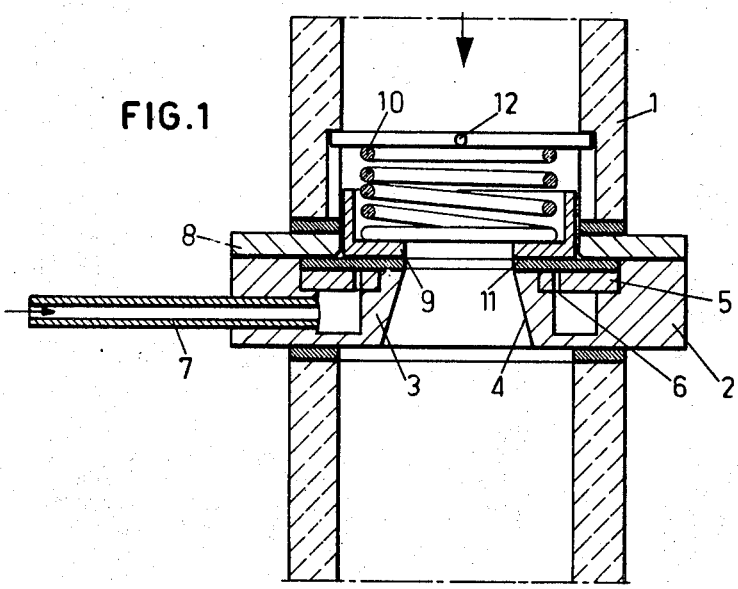

The invention relates to an apparatus for mixing a gas or a liquid to another gaseous or liquid medium, wherein the gas or liquid flows through a pipe having a local constriction formed by a rim which extends around the pipe inner wall and whose lateral surfaces are substantially perpendicular thereto, the inside of the rim widening conically, and at the constriction a radial annular slot is disposed to which the supply pipe for the gaseous or liquid medium to be mixed with the gas or liquid is connected and which so discharges into the pipe that the medium enters the pipe substantially perpendicularly to the axis of the liquid flow, as disclosed in Dutch patent specification 111,096.

This apparatus has the advantage of intermixing the two media rapidly, the satisfactory effect of the apparatus being ascribed to the eddies produced at the constriction in the liquid flow.

When the liquid is mixed with media which dissolve very rapidly in relation to the liquid—i.e., ammonia in water—the difficulty arises that the liquid is pulled by the medium into the slot in the direction of the supply pipe. This disadvantage is found even if there is no excess pressure in the supply line for the medium to be mixed with the gas or liquid.

It is an object of the invention to obviate this disadvantage of the prior art apparatus; to this end according to the invention the slot receives a ring made of rubber or some similar resiliently compressible material which, on the side of the slot remote from the inflow side of the constriction, at the place where the slot is connected to the supply pipe for the medium to be mixed with the gas or liquid, can close this connection, and opens the connection by the pressure of the medium against the force of a mechanical or pneumatic spring. The resilient ring therefore acts as a non-return valve. If a pneumatic spring is used, in the form of a hollow annular member made of a resilient material and connected to a pressure medium supply, the supply can be regulated to alter the width of the slot and close when necessary the connection between the slot and the supply.

Also according to the invention the annular valve can be hollow, made of rubber or some similar resiliently compressible material, and connected by its inside to a pressure medium supply. The valve member itself then acts as a spring.

Two embodiments of the apparatus according to the invention are shown in the drawings.

Figure 2:
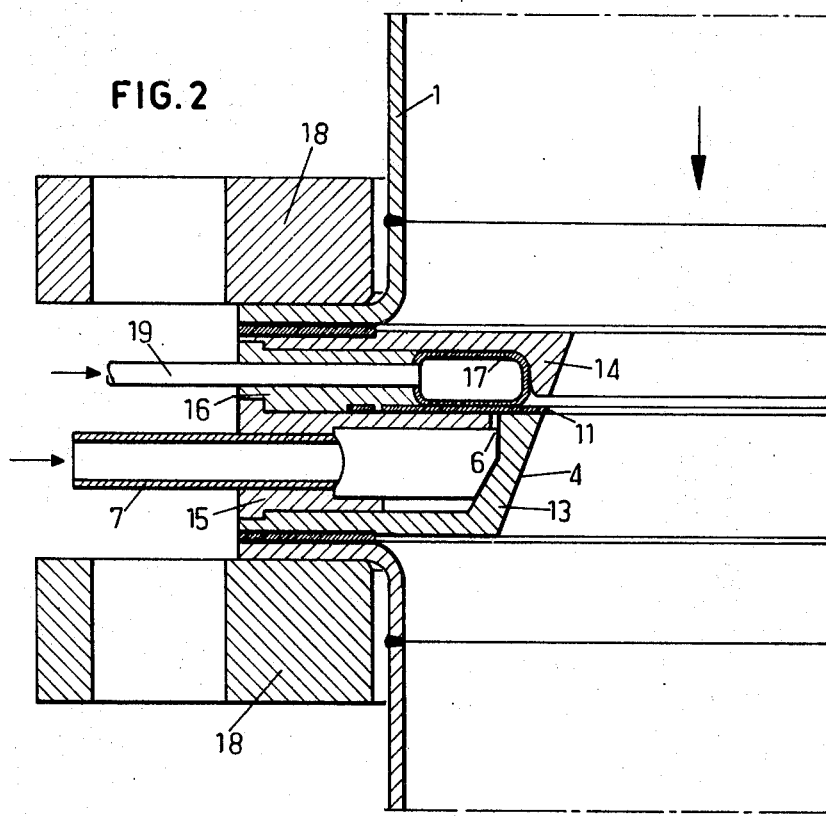

FIG. 1 is a longitudinal section through a mixing apparatus, in which the resilient annular valve is loaded by a helical spring; and FIG. 2 is a longitudinal section, with a partial side view, through a mixing apparatus, in which the resilient annular valve is loaded by a pneumatic spring in the form of resilient bellows.

In the embodiment shown in FIG. 1, a pipe 1 receives an annular casing 2 comprising a core member 3 formed with a bore 4 widening conically in the direction of flow. Disposed on the top of the casing 2 is a seat plate 5 formed with a number of passage 6 producing a connection between a supply pipe 7 for the medium to be mixed with the gas or liquid in the pipe 1 and the slot between the seat plate 5 and a dished member 9 loaded by as spring 10. Disposed in the resulting slot is an annular valve disc 11 made of rubber or some other suitable resiliently compressible material secured at its periphery by a thrust ring 8.

An adequate pressure of the medium emrging from the pipe 7 lifts the annular valve 11 against the force of the spring 10 which bears against a cruciform member 12. If the pressure of the medium is inadequate, the valve 11 closes, so that gas or liquid cannot reach the supply pipe 7 from the pipe 1, the valve 11 therefore acting as a non-return valve.

In the embodiment illustrated in FIG. 2, the constriction 4 in the pipe 1 is formed by two superimposed members 13, 14; the member 13 is closed at its periphery by a ring 15, and the member 14 by a ring 16. The members 13, 14 with the rings 15, 16 are clamped together by flanges 18 between the members of the pipe 1. Between the members 13, 14 is a slot receiving a resilient annular valve 11 clamped at its periphery between the rings 15, 16. Disposed in the cavity of the member 14 is a hollow annular member 17 acting as a pneumatic spring loading the valve 11 and able to close the annular slot 6 which makes the connection between the supply pipe 7 and the constriction 4 in the gas or liquid pipe. Clearly, therefore, in this case also the valve 11 acts as a non-return valve.

Connected to the annular spring member 17 is a pipe 19 by which, if required, compressed air can be admitted to the member 17 to retain the valve 11 closed or regulate the width of the outflow slot at the constriction 4. Alternatively, the annular valve 11 can be omitted, so that the annular spring member 17 also acts as a valve member.

What I claim is:

1. An apparatus for mixing a gas or a liquid to another gaseous or liquid medium, wherein the gas or liquid flows through a pipe having a constriction formed by a rim which extends around the pipe inner wall and whose lateral surfaces are substantially perpendicular thereto, the inside of the rim widening conically, and at the constriction a radial annular slot is disposed to which the supply pipe for the gaseous or liquid medium to be mixed with the gas or liquid is connected and which so discharges into the pipe that the medium enters the pipe substantially perpendicularly to the axis of the liquid flow, characterised in that the slot receives a ring made of rubber or some other similar resiliently compressible material which, on the side of the slot remote from the inflow side of the constriction, at the place where the slot is connected to the supply pipe for the medium to be mixed with the gas or liquid, can close this connection, and opens the connection by the pressure of the medium against the force of a mechanical or pneumatic spring.

2. An apparatus as set forth in claim 1, characterised in that the spring loading the annular flap takes the form of a hollow annular member made of a resilient material and is connected to a pressure medium supply.

3. An apparatus as set forth in claim 1, characterised in that the annular flap is made of rubber or some other similar resiliently compressible material and is connected by its inside to a pressure medium supply.

References Cited

UNITED STATES PATENTS

| | | | |
|---|---|---|---|
| 1,748,531 | 2/1930 | Troup | 137—525.5 X |
| 2,413,488 | 12/1946 | Drager | 259—168 |
| 2,650,075 | 8/1953 | Andrews | 261—118 X |
| 3,167,413 | 1/1965 | Kiekens | 261—V.S. |
| 3,441,245 | 4/1969 | Holland et al. | 251—61.1 X |

FOREIGN PATENTS 111,096  11/1964  Netherlands.

TIM R. MILES, Primary Examiner

U.S. Cl. X.R.

137—525.5; 251—61.1